May 23, 1967  L. DE SAINT MARTIN  3,321,139
APPARATUS FOR TREATING MOLTEN METALS
Filed Nov. 17, 1964  3 Sheets-Sheet 1

INVENTOR
Lucien de Saint Martin
BY  Michael J. Striker
His ATTORNEY

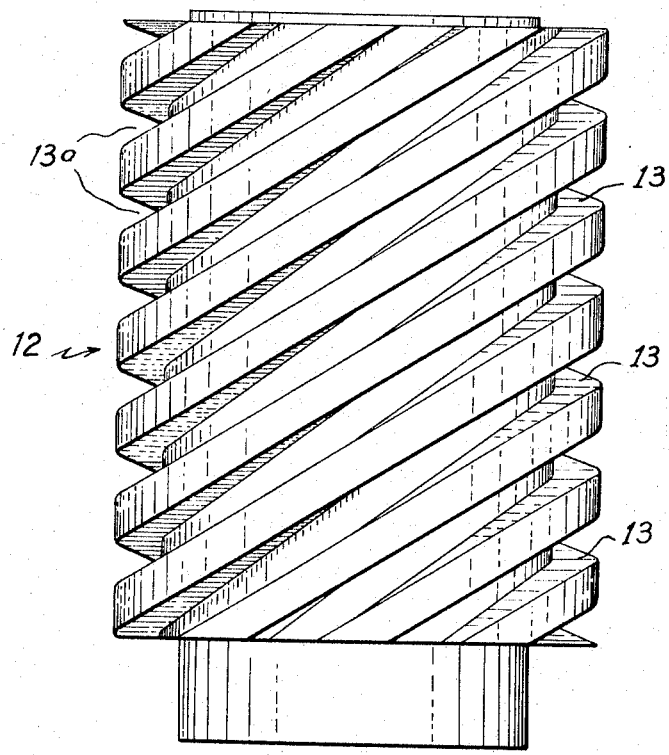

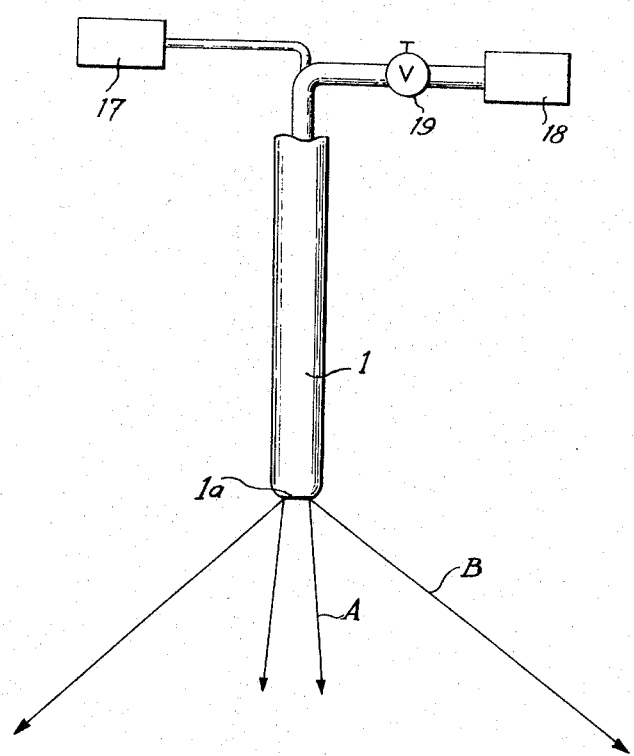

United States Patent Office 3,321,139
Patented May 23, 1967

3,321,139
APPARATUS FOR TREATING MOLTEN METALS
Lucien de Saint Martin, Saint-Germain-en-Laye, France, assignor to Institut de Recherches de la Siderurgie Francaise, Saint-Germain-en-Laye, France, a professional institution of France
Filed Nov. 17, 1964, Ser. No. 411,792
Claims priority, application France, Nov. 25, 1963, 954,884
10 Claims. (Cl. 239—132.3)

The present invention relates to apparatus for treating molten metals, and more particularly to an improved lance which may be utilized to admit comminuted solid and/or gaseous substances into metallurgical furnace, converter or the like. The apparatus of my present invention constitutes an improvement over and a further development of the apparatus disclosed in French Patent No. 1,237,740 and in U.S. Patent No. 3,111,243 to Lucien de Saint Martin.

It is an important object of the present invention to provide an improved lance which may be utilized to admit a comminuted solid substance, oxygen and/or another gaseous fluid through the cupola and into a metallurgical furnace or converter to improve the various steps which form part of a steel making process.

Another object of the invention is to provide a lance of the just outlined characteristics which is constructed and assembled in such a way that the penetration and spreading of one or more fluid streams issuing into the hearth of a metallurgical furnace may be adjusted at the will of the operators whereby the admission of fluids may be regulated in dependency on the momentary stage of the steel making operation.

A further object of the invention is to provide a lance wherein the parts most likely to be affected by intense heat or by the contents of a metallurgical furnace may be readily exchanged to be replaced by fresh parts so that the remainder of the lance need not be discarded just because a small component happens to require replacement.

An additional object of the invention is to provide a lance which is constructed in such a way that the spreading of flowable substances which are being discharged into the hearth of a metallurgical furnace may be regulated by remote control.

A concomitant object of the invention is to provide an improved tip for a lance of the above outlined characteristics.

Still another object of the invention is to provide a lance wherein the spreading of flowable material which issues from its tip may be regulated within an exceptionally wide range so that such material may be distributed on a selected area of molten metal or that such flowable material may penetrate the molten metal to a desired depth.

A further object of the invention is to provide a lance wherein such regulation of the speed and/or spreading of conveyed flowable material may be effected without sudden transition from one stage to another so that the rate of speed and/or the spreading of flowable material may be adjusted infinitely to suit, with utmost precision, specific requirements at any given stage of the steel making operation.

Still another object of the invention is to provide a lance which may be utilized for conveying and discharging of comminuted solid material which is suspended in a carrier fluid, and to construct the lance in such a way that the uniformity of distribution of pulverulent material in the carrier fluid is improved just before the carrier fluid issues from the tip of the lance.

An additional object of the invention is to provide an exceptionally simple, rugged, inexpensive and versatile lance of the above outlined characteristics which does not have or need not have any moving parts, which can be readily taken apart for the purposes of inspection, cleaning and/or replacement of its parts, which can be reassembled with little loss in time, and which may be readily installed in all or nearly all presently known metallurgical furnaces.

A further object of the invention is to provide a novel method of regulating the admission of fluids into metallurgical furnaces.

Briefly stated, one feature of my invention resides in the provision of a lance for admitting fluids into steel furnaces and the like. The lance comprises a shaft or shank including an inner pipe defining a first fluid conveying channel and an outer pipe spacedly surrounding the inner pipe and defining therewith a second fluid conveying channel which is of annular cross section. The pipes have fluid discharging end portions which define between themselves an annular gap communicating with both channels and located in a plane which is perpendicular to the axis of the shaft. One of the two end portions comprises spinning means extending into the second channel upstream of the gap to circulate the fluid in the second channel around the inner pipe so that such fluid spins on entry into the gap and, depending on its selected velocity and pressure, affects to a desired degree the configuration of the fluid stream which issues from the discharge end of the inner pipe. The inner pipe is connected to a source of a first fluid, for example, oxygen gas or a mixture of oxygen gas with a pulverulent substance. The outer pipe is connected with a source of compressed fluid, for example, oxygen gas, and the connection between the outer pipe and the corresponding source preferably comprises pressure regulating means to insure that one or more streams of circulating fluid will enter the annular gap at a desired velocity to thereby influence the expansion of the stream which issues from the inner pipe.

The method of my invention comprises the basic steps of conveying a first fluid stream in a first restricted path and discharging the stream at one end of this path, conveying a second stream of compressed fluid in a second restricted path which surrounds the first path, spinning the fluid in the second path to circulate the same around the first path and directing the circulating fluid radially inwardly at the one end of the first path so that the second fluid spreads the fluid issuing from the first path, and regulating the fluid pressure in the second stream to thereby vary the spreading effect upon the first fluid stream.

The novel features which are considered as characteristic of the invention are set forth in particular in the appended claims. The improved lance itself, however, both as to its construction and the mode of assembling and using the same, together with additional features and advantages thereof, will be best understood upon perusal of the following detailed description of a specific embodiment with reference to the accompanying drawings, in which:

FIG. 2 is an enlarged side elevational view of the end portion of the inner pipe in the lance of FIG. 1; and FIG. 3 is a smaller-scale diagrammatic illustration of an apparatus which utilizes a lance of the type shown in FIG. 1.

Figure 1:
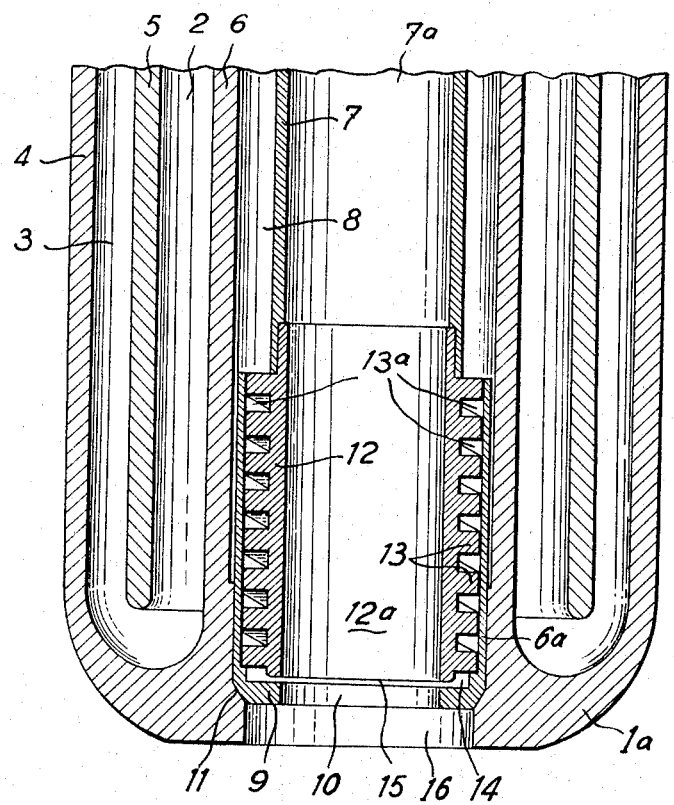
FIG. 1 is a fragmentary axial section through the discharge end of a lance which is constructed in accordance with the present invention.

Referring to the drawings, and first to FIG. 1, there is shown a portion of a lance which includes a shank or shaft 1 comprising an inner pipe 7 preferably consisting of copper or another suitable nonferrous metallic material and defining a cylindrical central channel 7a for a first fluid medium, for example, oxygen gas which serves as a carrier for finely comminuted pulverulent material. The shaft 1 of the lance shown in FIG. 1 further comprises an outer pipe 6 which spacedly surrounds and is coaxial with the pipe 7 so that the two pipes define an outer channel 8 which is of annular cross section and which serves to convey a stream of a second fluid, for example, a stream of oxygen gas which is utilized to control the penetration and/or spreading of the fluid issuing from the central channel 7a. The outer pipe 8 preferably consists of steel or another suitable ferrous material.

In accordance with one feature of the present invention, the end portion of the outer pipe 6 is provided with a rearwardly diverging conical shoulder 11 and includes a cylindrical sleeve 6a whose front end face has a conical shoulder abutting against the shoulder 11 to thereby keep the sleeve 6a in the illustrated position. The sleeve 6a further comprises an annular collar 9 which extends inwardly from the shoulder 11 and is provided with a centrally located opening 10 which registers with the channel 7a. The opening 10 also communicates with a coaxial opening 16 of larger diameter the inner end of which is surrounded by the shoulder 11. Thus, the fluid stream flowing through the channel 7a will pass first through the openings 10 and 16 and thereupon forms a jet which may impinge against the surface of molten material in a metallurgical furnace.

The end portion of the inner pipe 7 comprises a cylindrical spinning or swirling member here shown as a nipple 12 which is detachably secured to the remainder of the pipe 7 and is provided with a series of external helical threads 13, best shown in FIG. 2. The threads 13 are telescoped into the sleeve 6a so that the sleeve closes the radially outer sides of helical grooves 13a which open into an annular chamber 14 defined by the collar 9 and the foremost end of the spinning member 12. This chamber 14 surrounds and is in communication with an annular gap 15 which communicates with the channels 7a and 8 and is located in a plane perpendicular to the axis of the shaft 1. It will be noted that the gap 15 is of small axial length and that this gap is bounded by the inner side of the collar 9 and the front end face of the spinning member 12. The fluid which is caused to flow into the outer channel 8 will be compelled to spin while passing through the grooves 13a and will circulate at the time it enters the annular chamber 14. Such circulating fluid is then compelled to pass radially inwardly to flow into and through the gap and to influence the shape of the fluid stream issuing from the bore 12a of the spinning member 12. This bore 12a constitutes the foremost portion of the inner channel 7a.

The lance of my invention further comprises a cooling jacket which surrounds the outer pipe 6 and serves to circulate cold water or another suitable coolant. In the illustrated embodiment, the cooling jacket comprises an outer tube 4 whose foremost end is sealingly connected or integral with the foremost end of the outer pipe 6 and an inner tube 5 which is spacedly surrounded by the outer tube 4 and surrounds with clearance the outer pipe 6. Thus, a coolant which is admitted downwardly through the annular passage 2 between the pipe 6 and tube 7 will be deflected around the foremost end of the tube 5 and thereupon flows in the opposite direction through the annular passage 3 between the tubes 4 and 5. The integral connection between the outer tube 4 and outer pipe 6 is indicated at 1a. The tubes 4, 5 may consist of the same material as the outer pipe 6.

The lance of my invention is operated as follows:

The shaft 1 is introduced into a furnace so that the discharge opening 16 is located at a requisite distance from the bath. A first stream of compressed fluid is admitted from a first source 17 (see FIG. 3) so as to flow through the channel 7a, through the openings 10 and 16, and to impinge against the top surface of the heat. On leaving the opening 16, such fluid stream will spread slightly to form a cone A whose angle of divergence is relatively small, e.g., about 4 degrees. A second compressed fluid is discharged from a second source 18 to enter the annular channel 8 and to spin on passing through the grooves 13a. In other words, the second fluid will spin at the time it enters the annular chamber 14 and continues to spin while it flows through the annular gap 15 toward the periphery of the cone issuing from the bore 12a. Such spinning fluid will impart to the first fluid stream a tangential component which will tend to spread the cone so that the angle of divergence of the resulting cone B (see FIG. 3) may equal or even exceeds 60 degrees. The exact angle of divergence may be selected by a pressure regulating device 19 which is provided in the conduit between the second source 18 and the outer pipe 6. At the same time, the operators connect a source of cold water to the passage 2 so that such coolant flows in the tube 5 to exchange heat with the outer pipe 6 and the thus preheated coolant then flows into and through the outer passage to cool the outer tube 4. The direction of coolant flow may be reversed.

It will be noted that the stream of circulating second fluid which passes through the annular gap 15 will assist the first fluid stream to expand by subjecting the first fluid stream to the action of centrifugal forces. Thus, by the simple expedient of mixing the first fluid stream with a circulating second fluid stream, one can change the angle of divergence from 4 to 60 degrees or even higher. Such changes may be effected by regulating the pressure of the secondary fluid stream within a wide range, for example, from zero to a pressure of up to 6 and even up to 8 bars. If the pressure of the second fluid stream is reduced, the conicity of the central fluid stream is also reduced and such fluid stream will be capable to penetrate deeper into the mass of molten material in the furnace. On the other hand, by increasing the angle of divergence of the cone, the first fluid stream will be distributed over a larger area of the heat. The pressure regulating device 19 may comprise a suitable valve which enables the operator to select any desired fluid pressure in the second channel 8 and to thereby select the angle of divergence from an infinite number of values.

Without further analysis, the foregoing will so fully reveal the gist of the present invention that others can, by applying current knowledge, readily adapt it for various applications without omitting features which fairly constitute essential characteristics of the generic and specific aspects of this invention and, therefore, such adaptations should and are intended to be comprehended within the meaning and range of equivalence of the following claims.

What is claimed as new and desired to be secured by Letters Patent is:

1. A lance for admitting fluids into steel furnaces and the like, comprising a shaft including an inner pipe defining a first fluid conveying channel and an outer pipe spacedly surrounding said inner pipe and defining therewith a second fluid conveying channel, said pipes having fluid discharging end portions defining between themselves an annular gap which communicates with said channels, the end portion of said inner pipe being detachably secured to the remainder of said inner pipe and comprising at least one external thread extending into said second channel and defining a helical groove which opens into said gap to circulate the fluid in said second channel so that such fluid spins on entry into said gap and the end portion of said outer pipe further comprising a cylindrical sleeve telescopically receiving said external thread to close the radially outer side of said groove, said sleeve having a radially inwardly extending annular collar which is spaced from the end portion of said inner pipe to define therewith said gap.

2. A lance for admitting fluids into steel furnaces and the like, said lance having a front end face and comprising a first fluid-conveying channel having a large discharge opening in said front end face of said lance of a diameter at least equal to the diameter of said first channel, a second fluid-conveying channel surrounding said first fluid-conveying channel, and an annular transverse gap communicating with said second channel and opening into said first channel and extending substantially normal to both said channels at a short distance inwardly of said large discharge opening of said first channel; and spinning means arranged for spinning fluid passing through said second channel so that such fluid is in circulatory motion when it enters said first channel through said annular transverse gap of said lance in a direction transverse to the flow of fluid through said first channel, so that said fluids are thoroughly mixed and will issue from said large discharge opening in divergent flow.

3. A lance as defined in claim 2, wherein said spinning means defines at least one helical groove opening into said second channel and into said transverse gap.

4. A lance as defined in claim 2, and further comprising an annular chamber surrounding said gap and communicating therewith so that the fluid circulates on entry into said chamber and is in circulatory motion when it is admitted into said gap.

5. A lance as defined in claim 2, and comprising an inner and an outer pipe at least end portions of which are substantially coaxial, said pipes defining said first and second channels.

6. A lance as defined in claim 5, wherein the end portion of said inner pipe is detachably secured to the remainder of said inner pipe and comprises at least one external thread extending into said second channel and defining a helical groove which opens into said gap.

7. A lance as defined in claim 5, and further comprising a coolant-receiving jacket surrounding said second channel.

8. A lance as defined in claim 2, wherein said short distance is at most equal to the diameter of said discharge opening of said first channel.

9. A lance as defined in claim 7, wherein said jacket comprises a first tube spacedly surrounding said outer pipe and a second tube spacedly surrounding said first tube, said second tube having an end portion sealingly secured to the end portion of said outer pipe forwardly of the end portion of said first tube, so that a coolant which is admitted into one of said tubes in a direction toward the end portion of said outer pipe is caused to reverse direction and to flow in opposite direction through the other tube.

10. A lance as defined in claim 2, and further comprising a source of first fluid connected with said first channel and a source of compressed second fluid connected wth said second channel; and means for regulating the pressure of second fluid which enters said second channel.

References Cited by the Examiner

UNITED STATES PATENTS

| | | | |
|---|---|---|---|
| 2,894,569 | 7/1959 | Jacolen | 239—132.5 |
| 2,905,234 | 9/1959 | Scholz | 239—132 |
| 3,076,607 | 2/1963 | Cordier | 239—132.5 |
| 3,111,243 | 11/1963 | De Saint Martin | 222—193 |

FOREIGN PATENTS 522,363  6/1940  Great Britain.

EVERETT W. KIRBY, *Primary Examiner.*